(12) United States Patent
Lee et al.

(10) Patent No.: US 11,398,662 B2
(45) Date of Patent: Jul. 26, 2022

(54) BATTERY MODULE HAVING IMPROVED CONNECTION STRUCTURE OF SENSING WIRE HARNESS AND ASSEMBLY METHOD THEREOF

(71) Applicant: LG CHEM, LTD., Seoul (KR)

(72) Inventors: Gang-U Lee, Daejeon (KR); Jun-Yeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 475 days.

(21) Appl. No.: 15/770,611

(22) PCT Filed: Jun. 2, 2017

(86) PCT No.: PCT/KR2017/005797
§ 371 (c)(1),
(2) Date: Apr. 24, 2018

(87) PCT Pub. No.: WO2017/213384
PCT Pub. Date: Dec. 14, 2017

(65) Prior Publication Data
US 2018/0315976 A1    Nov. 1, 2018

(30) Foreign Application Priority Data

Jun. 8, 2016 (KR) .................. 10-2016-0071204

(51) Int. Cl.
*H01M 8/24* (2016.01)
*H01M 6/42* (2006.01)
(Continued)

(52) U.S. Cl.
CPC ......... *H01M 50/502* (2021.01); *H01M 10/48* (2013.01); *H01M 10/482* (2013.01); *H01R 4/30* (2013.01); *H01M 50/20* (2021.01)

(58) Field of Classification Search
None
See application file for complete search history.

(56) References Cited

U.S. PATENT DOCUMENTS

| | | |
|---|---|---|
| 6,346,011 B1 | 2/2002 | Ikeda |
| 2008/0085446 A1 | 4/2008 | Schmidt et al. |

(Continued)

FOREIGN PATENT DOCUMENTS

| | | |
|---|---|---|
| EP | 2 791 997 A | 10/2014 |
| JP | 2003-272603 A | 9/2003 |

(Continued)

OTHER PUBLICATIONS

English translation of the Written Opinion of the International Searching Authority for International Application No. PCT/KR2017/005797, dated Sep. 27, 2017.

(Continued)

*Primary Examiner* — Cynthia H Kelly
*Assistant Examiner* — Julian Anthony
(74) *Attorney, Agent, or Firm* — Birch, Stewart, Kolasch & Birch, LLP

(57) ABSTRACT

Provided is a battery module including: a cell assembly in which a plurality of cells are arranged at a predetermined interval, wherein each of the plurality of cells includes a cell lead; a sensing wire harness disposed around the cell lead and including a connecting terminal corresponding to the cell lead, wherein the connecting terminal is directly bonded to the cell lead; and a connector connected to the sensing wire harness by being fixed at one side of the cell assembly.

18 Claims, 5 Drawing Sheets

(51) Int. Cl.
*H01M 50/502* (2021.01)
*H01R 4/30* (2006.01)
*H01M 10/48* (2006.01)
*H01M 50/20* (2021.01)

(56) References Cited

U.S. PATENT DOCUMENTS

| | | | | |
|---|---|---|---|---|
| 2008/0102691 | A1* | 5/2008 | Darr | H01M 2/1038 |
| | | | | 439/500 |
| 2010/0052692 | A1 | 3/2010 | Yano et al. | |
| 2010/0310909 | A1 | 12/2010 | Yun et al. | |
| 2011/0059342 | A1* | 3/2011 | Lee | H01M 10/482 |
| | | | | 429/93 |
| 2012/0225348 | A1* | 9/2012 | Kim | H01M 50/10 |
| | | | | 429/179 |
| 2013/0065103 | A1 | 3/2013 | Yumura | |
| 2014/0220420 | A1 | 8/2014 | Yoshioka et al. | |
| 2015/0044543 | A1* | 2/2015 | Yoon | H01M 10/4235 |
| | | | | 429/158 |
| 2015/0136438 | A1* | 5/2015 | Lumetta | H01M 2/202 |
| | | | | 174/68.2 |
| 2016/0072112 | A1 | 3/2016 | Smith et al. | |
| 2016/0218401 | A1* | 7/2016 | Hermann | H01M 50/20 |
| 2018/0308634 | A1 | 10/2018 | Shimizu et al. | |

FOREIGN PATENT DOCUMENTS

| | | |
|---|---|---|
| JP | 2005-267880 A | 9/2005 |
| JP | 2007-66653 A | 3/2007 |
| JP | 2008-518414 A | 5/2008 |
| JP | 2011-502337 A | 1/2011 |
| JP | 2013-89488 A | 5/2013 |
| JP | 2013-179094 A | 9/2013 |
| JP | 2014-49343 A | 3/2014 |
| JP | 2014-216248 A | 11/2014 |
| JP | 2014-220153 A | 11/2014 |
| JP | 2016-100210 A | 5/2016 |
| KR | 10-2012-0120675 A | 11/2012 |
| KR | 10-2014-0084563 A | 7/2014 |
| KR | 10-2015-0062777 A | 6/2015 |
| KR | 10-2015-0070511 A | 6/2015 |
| WO | WO 2011/148641 A1 | 12/2011 |

OTHER PUBLICATIONS

International Search Report for PCT/KR2017/005797 dated Sep. 27, 2017.

* cited by examiner

BATTERY MODULE HAVING IMPROVED CONNECTION STRUCTURE OF SENSING WIRE HARNESS AND ASSEMBLY METHOD THEREOF

TECHNICAL FIELD

The present application claims priority to Korean Patent Application No. 10-2016-0071204 filed on Jun. 8, 2016 in the Republic of Korea, the disclosure of which is incorporated herein by reference.

The present disclosure relates to a battery module and an assembly method thereof, and more particularly, to a battery mode having an improved connection structure between a cell and a voltage sensing wire harness, and an assembly method thereof.

BACKGROUND ART

Generally, a battery module has a structure in which a plurality of cells are gathered through series and/or parallel connection. Such a battery module is manufactured in a structure including a cell assembly in which a plurality of cells are generally arranged in one direction and are substantially stacked on each other.

In the battery module where the plurality of cells are gathered, safety and operation efficiency are adversely affected when an event, such as an overvoltage or an overcurrent, occurs in some cells, and thus a unit for detecting voltage abnormality or the like is required. In this regard, generally, a method of checking and controlling an operation state of each cell in real-time or at regular intervals by connecting a sensing circuit unit including a voltage sensor to the each cell is widely used.

A battery module according to conventional technology employs, for voltage detection with respect to each cell, a sensing assembly including a printed circuit board (PCB) 12 disposed on an the top of a body of a cell assembly 10, a connector 13 mounted on the PCB 12 to access a predetermined sensing circuit unit, and a plurality of bus bars 14 protruding from two edges of the PCB 12 based on a length direction and connected to a cell lead 11, as shown in FIGS. 1 and 2. Such a structure of the sensing assembly is disclosed in Korean Patent Application Publication No. 2012-0120675.

The structure of the sensing assembly is realized via assembly processes including operations of fixing the PCB 12 to a top of a module body, while welding the bus bar 14 when the bus bar 14 is inserted into a bottom of the cell lead 11.

However, when the PCB 12 and the bus bar 14 are used as such, the bus bar 14, i.e., a separate metal, needs to be separately designed and manufactured, and then mounted on the PCB 12, and thus production costs may be high. Also, since a space for inserting and disposing the bus bar 14 at the bottom of the cell lead 11 needs to be secured, space utility is poor.

As an alternative, Korean Patent Application Publication No. 2014-0084563 discloses a voltage sensing circuit of a car battery, in which each of sensing bus bars is bonded to a cell lead via laser welding, and wires are connected to each of the sensing bus bars to discharge current flowed into the sensing bus bars. However, such a method requires a separate sensing bus bar as described above, and thus reducing of production costs may be limited. Also, since a process of laser-welding the sensing bus bar to the cell lead, and a process of bending a compressed piece formed on the sensing bus bar and pressing the compressed piece to one end of the wire to be connected thereto need to be accompanied, large process costs are still required.

DISCLOSURE

Technical Problem

The present disclosure is designed to solve the problems of the related art, and therefore the present disclosure is directed to providing a battery module having a structure capable of simplifying a bonding process between a cell lead and a voltage sensing wire harness and capable of reducing volume of a module, and an assembly method thereof.

The present disclosure is also directed to providing a battery module capable of preventing occurrence of deformation in a lead plate while welding a sensing wire harness and a cell lead, and an assembly method thereof.

Technical Solution

In one aspect of the present disclosure, there is provided a battery module including: a cell assembly in which a plurality of cells are arranged at a predetermined interval, wherein each of the plurality of cells includes a cell lead; a sensing wire harness disposed around the cell lead and including a connecting terminal corresponding to the cell lead, wherein the connecting terminal is directly bonded to the cell lead; and a connector connected to the sensing wire harness by being fixed at one side of the cell assembly.

The connecting terminal of the sensing wire harness may be bonded to the cell lead via welding.

The cell lead may be provided on two sides of the connector at a predetermined interval, and the sensing wire harness may extend in an arrangement direction of the cell lead.

The connector may be fixed to a body of the cell assembly by a screw member.

The cell lead may include a first lead plate and a second lead plate that overlap each other.

Each of the first lead plate and the second lead plate may be formed of at least two layers of thin slices.

In another aspect of the present disclosure, there is also provided an assembly method of a battery module, the assembly method including: (a) preparing a cell assembly in which a plurality of cells are arranged, wherein each of the plurality of cells includes a cell lead; (b) locating a sensing wire harness including a connecting terminal around the cell lead; (c) aligning the connecting terminal of the sensing wire harness to correspond to each cell lead; and (d) directly bonding the connecting terminal to the cell lead.

In the operation (d), the connecting terminal of the sensing wire harness may be directly welded to the cell lead by performing ultrasonic welding or laser welding.

The welding may be performed while the connecting terminal of the sensing wire harness is aligned to correspond to the cell lead by using a jig.

The operation (b) may further include disposing a connector connectable to the sensing wire harness on a top of a body of the cell assembly and fixing the connector by using a screw member.

The connector may be disposed such that the cell lead is located on two sides of the connector.

In the operation (b), the cell lead may be disposed at two sides of the connector at a predetermined interval and the sensing wire harness may be disposed to extend in an arrangement direction of the cell lead.

In another aspect of the present disclosure, there is also provided an assembly method of a battery module, the assembly method including: (1) preparing a cell assembly in which a plurality of cells are arranged at a predetermined interval, wherein a cell lead including a first lead plate is drawn out from each of the plurality of cells; (2) preparing a sensing wire harness including a connecting terminal and directly bonding a second lead plate to the connecting terminal; (3) locating the sensing wire harness around the cell lead; and (4) bonding the first lead plate and the second lead plate to overlap each other.

In the operation (2), the connecting terminal of the sensing wire harness may be directly welded to the second lead plate by performing ultrasonic welding or laser welding.

The assembly method may further include disposing a connector connectable to the sensing wire harness on a top of a body of the cell assembly, and fixing the connector by using a screw member.

Preferably, the connector may be disposed such that the cell lead is located on two sides of the connector.

In the operation (3), the cell lead may be disposed at two sides of the connector at a predetermined interval and the sensing wire harness may be disposed to extend in an arrangement direction of the cell lead.

Advantageous Effects

According to the present disclosure, assembly process costs may be reduced by simplifying a bonding process between a cell lead and a voltage sensing wire harness.

Also, since a separate connection metal and a fixing structure thereof may be omitted by directly welding a cell lead and a wire harness, material costs may be reduced and space utility may be increased.

Also, by disposing lead plates forming a cell lead to overlap each other and welding a connecting terminal directly on the lead plate, the cell lead may be prevented from being deformed by heat generated during welding.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Figure 1:
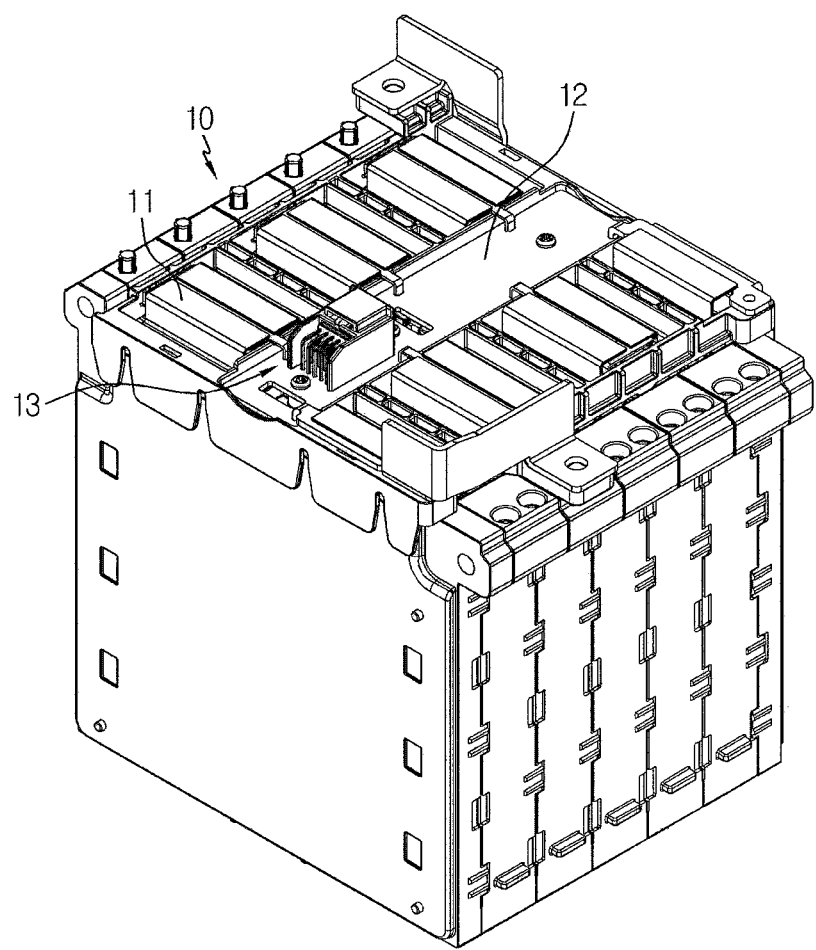
FIG. 1 is a perspective view of a structure of a battery module according to conventional technology.
Figure 2:
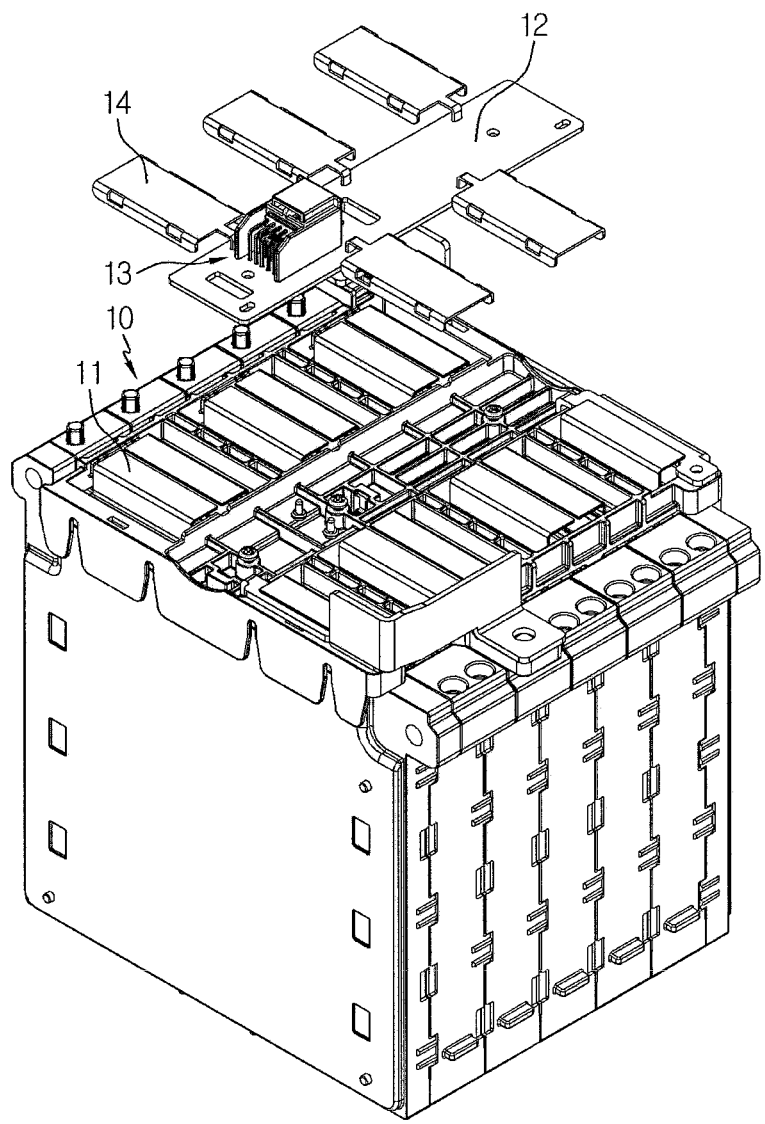
FIG. 2 is a partial exploded view of FIG. 1.
Figure 3:
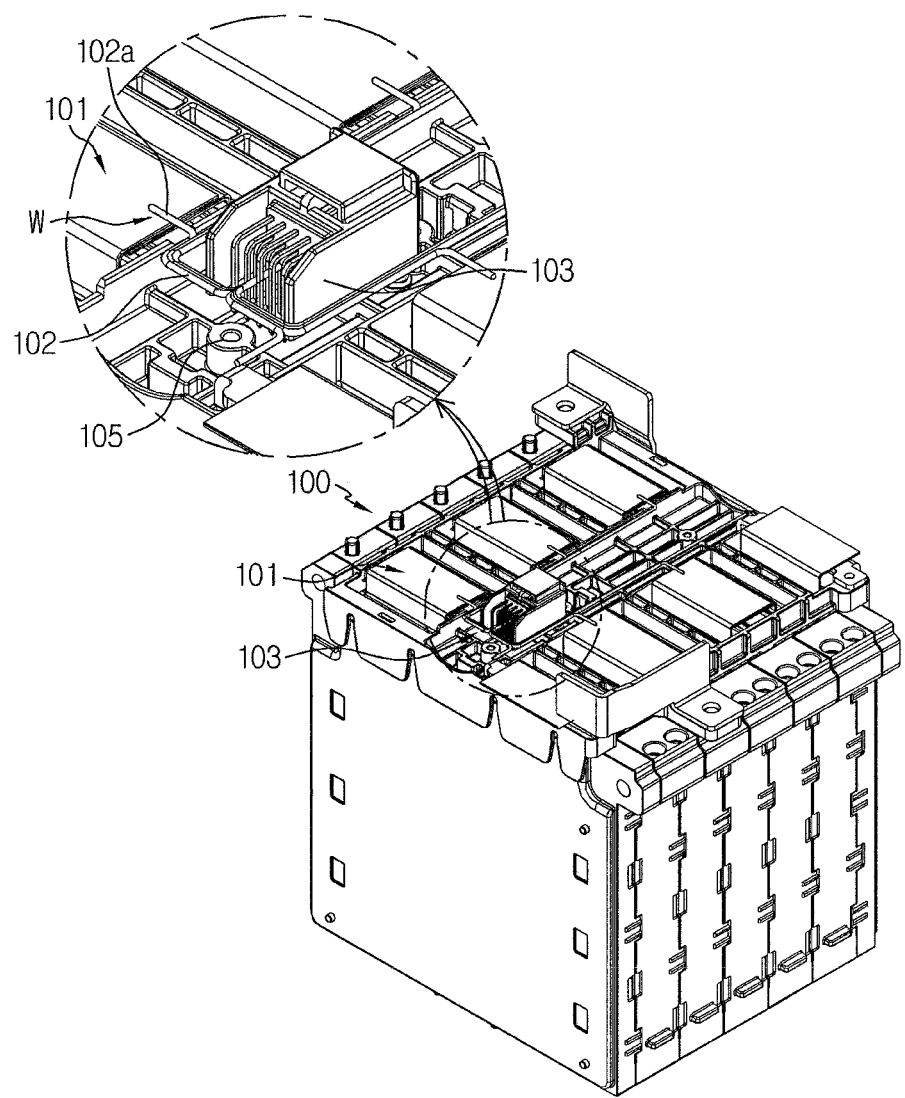
FIG. 3 is a partial enlarged perspective view of a structure of a battery module according to a preferable embodiment of the present disclosure.
Figure 4:
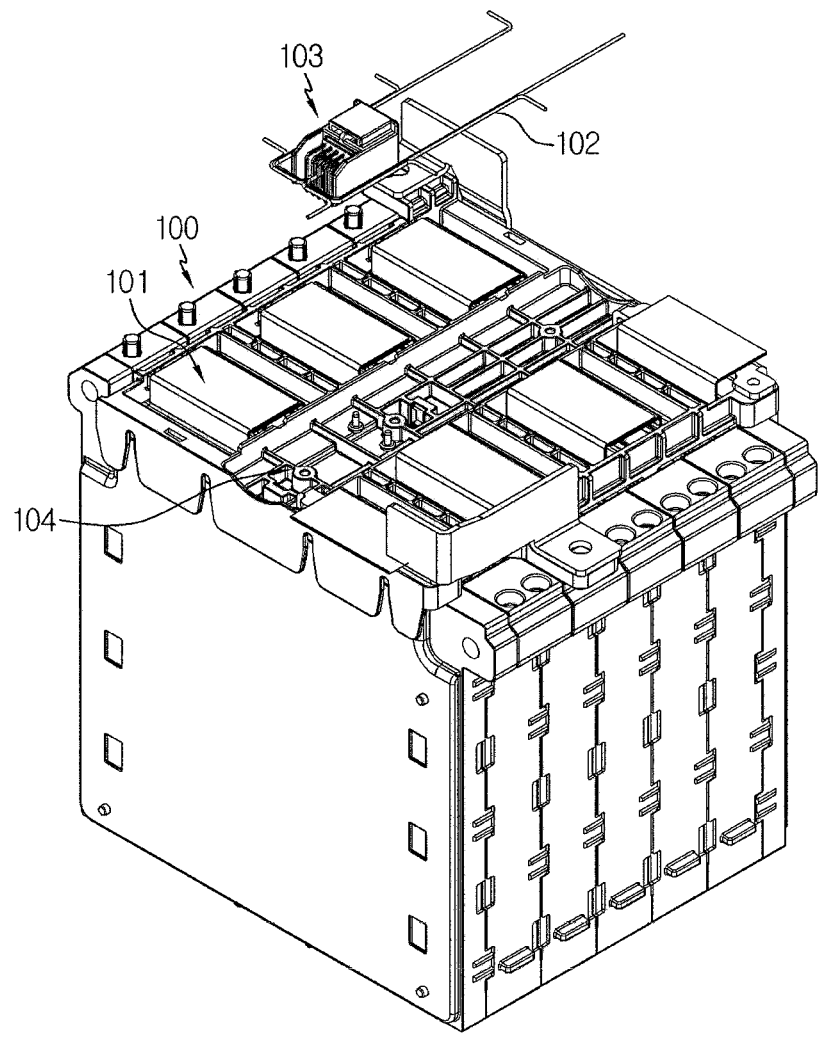
FIG. 4 is a partial exploded view of FIG. 3.

FIG. 3 is a partial enlarged perspective view of a structure of a battery module according to a preferable embodiment of the present disclosure, and FIG. 4 is a partial exploded view of FIG. 3.

Referring to FIGS. 3 and 4, a battery module according to a preferable embodiment of the present disclosure includes a cell assembly 100 in which a plurality of cells are arranged, a sensing wire harness 102 disposed on a top of the cell assembly 100 and directly welded to a cell lead 101, and a connector 103 fixed to a body of the cell assembly 100 and connected to the sensing wire harness 102.

In the cell assembly 100, the plurality of cells are arranged in one direction at a predetermined interval, and the cell lead 101 is drawn out from each cell. Each cell has a thin plate shaped body, and preferably, is configured by a pouch type secondary battery. The plurality of cells are arranged in one direction of the cell assembly 100 to substantially form a stacked structure. A predetermined support frame for fixing each cell is combined to the cell assembly 100.

The sensing wire harness 102 provides a leading wire for measuring a cell voltage, and includes a plurality of wires each corresponding to the cell lead 101, wherein a connecting terminal 102a that is a welding region is located at the end of each wire. The sensing wire harness 102 is disposed on the top of the cell assembly 100 so as to be located around the cell lead 101, and the connecting terminal 102a drawn out from the sensing wire harness 102 is directly bonded to the cell lead 101 via ultrasonic welding or laser welding.

The connector 103 mediates connection between the sensing wire harness 102 and a predetermined voltage sensing circuit module (not shown), and is directly mounted onto an accommodating part 104 provided on a top of the body of the cell assembly 100. A screw coupling unit 105 is provided on the top of the body of the cell assembly 100, and the connector 103 is fixed to the accommodating part 104 via screw coupling with respect to the screw coupling unit 105. The sensing wire harness 102 is connected to an input terminal of the connector 103.

The cell lead 101 is arranged on two sides of the accommodating part 104 at a predetermined interval, and the sensing wire harness 102 is arranged in a longitudinal direction of the accommodating part 104 to extend in an arrangement direction of the cell lead 101.

Figure 5:
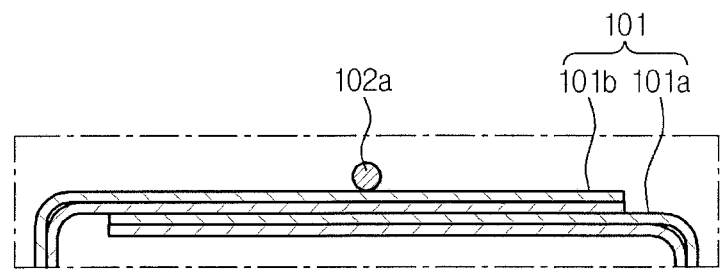
FIG. 5 is a cross-sectional view illustrating a connection structure between a cell lead and a sensing wire harness of FIG. 3.

FIG. 5 illustrates in detail a connection structure between the cell lead 101 and the sensing wire harness 102. As shown in FIG. 5, the connecting terminal 102a of the sensing wire harness 102 is welded to directly contact a surface part of the cell lead 101. An area of a flat surface of the cell lead 101 to which the connecting terminal 102a is welded may be as large as possible such that the connecting terminal 102a of the sensing wire harness 102 is strongly supported and thus a welding operation is smoothly performed. In this case, the cell lead 101 may be provided in a structure in which a first lead plate 101a and a second lead plate 101b overlap each other. At this time, the first and second lead plates 101a and 101b may each be formed in at least two layers of thin slices so as to minimize deformation of a cell lead due to thermal expansion occurred during welding.

Figure 6:
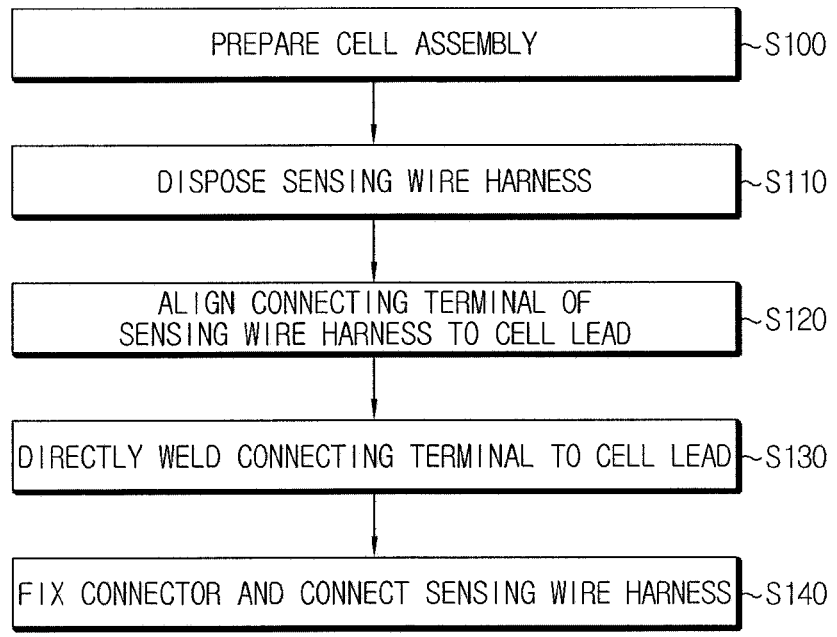
FIG. 6 is a flowchart of an assembly method of a battery module according to a preferable embodiment of the present disclosure.

Next, an assembly method of a battery module according to a preferable embodiment of the present disclosure will be described with reference to FIG. 6.

First, the cell assembly 100 in which a plurality of cells are arranged in one direction, wherein the cell lead 101 is drawn out from each cell, is prepared (operation S100), and the sensing wire harness 102 is disposed in the accommodating part 104 provided at the top of the cell assembly 100 (operation S110).

Then, in order to connect a sensing wire for voltage measurement to each cell, the connecting terminal 102a of the sensing wire harness 102 is aligned to correspond to the cell lead 101 (operation S120). At this time, the sensing wire harness 102 maintains a state in which the connecting terminal 102a is placed on an external surface of the cell lead 101 while the sensing wire harness 102 is supported by a predetermined jig.

After aligning the connecting terminal 102a of the sensing wire harness 102 on the cell lead 101, ultrasonic welding or laser welding is performed directly with respect to the connecting terminal 102a to weld and connect the connecting terminal 102a to the cell lead 101 (operation S130).

The connector 103 that mediates connection between the sensing wire harness 102 and the voltage measuring circuit module is disposed in the accommodating part 104 prepared on the top of the body of the cell assembly 100, and then is fixed by using a screw member. After the connector 103 is fixed, the sensing wire harness 102 is connected to the input terminal of the connector 103 to complete assembly (operation S140).

Figure 7:
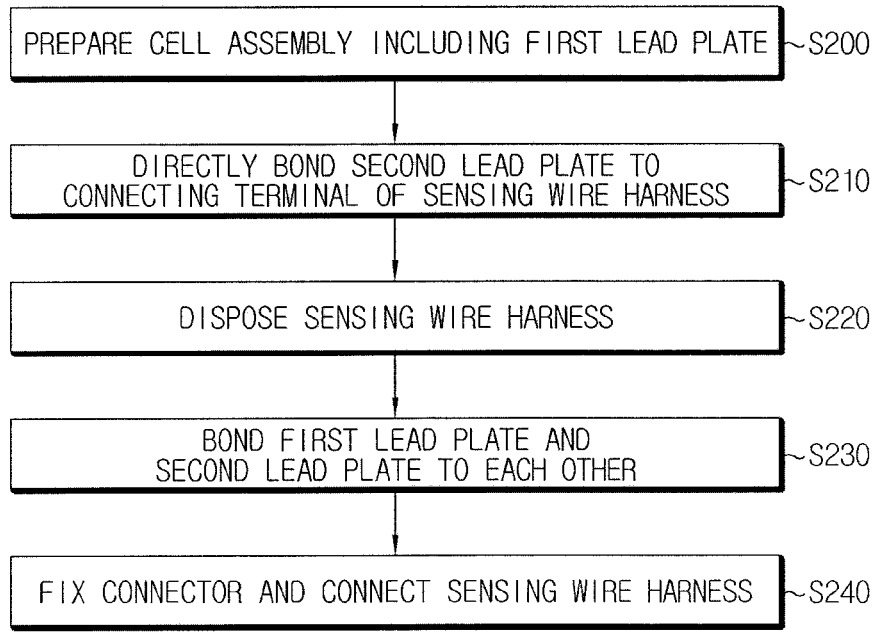
FIG. 7 is a flowchart of an assembly method of a battery module according to another embodiment of the present disclosure.

FIG. 7 is a flowchart of an assembly method of a battery module according to another embodiment of the present disclosure.

First, the cell assembly 100 in which the plurality of cells are arranged in one direction, wherein each cell includes the first lead plate 101a, is prepared (operation S200).

Then, the second lead plate 101b is directly bonded to the connecting terminal 102a of the sensing wire harness 102 (operation S210). In detail, the connecting terminal 102a of the sensing wire harness 102 is aligned on the second lead plate 101b, and then the connecting terminal 102a is welded and connected to the second lead plate 101b by performing ultrasonic welding or laser welding directly with respect to the connecting terminal 102a. Through such processes, the sensing wire harness 102 is provided in the accommodating part 104 while the second lead plate 101b is bonded per connecting terminal 102a (operation S220).

While the sensing wire harness 102 is disposed in the accommodating part 104, the first lead plate 101a and the second lead plate 101b are disposed to overlap each other and then a bonding process, such as welding, soldering, or adhering, is performed (operation S230). When the first and second lead plates 101a and 101b are connected to each other via the bonding process, connection between the cell lead 101 and the sensing wire harness 102 is completed.

The connector 103 that mediates connection between the sensing wire harness and the voltage measuring circuit module is disposed in the accommodating part 104 provided at the top of the body of the cell assembly 100, and then is fixed by using a screw member. In the current embodiment, since a process of welding the sensing wire harness 102 to the second lead plate 101b of the cell lead 101 does not have to be performed on the body of the cell assembly 100, a fixing process of the connector 103 may be performed before a disposing process of the sensing wire harness 102. After the connector 103 is fixed, the sensing wire harness 102 is connected to the input terminal of the connector 103 to complete assembly (operation S240).

As described above, in the battery module according to the present disclosure, since the cell lead 101 and the sensing wire harness 102 are connected to each other by being directly welded to each other, a separate connection metal and a fixing structure thereof are omitted unlike existing technology, and thus production costs may be reduced and the volume of a module may be reduced.

INDUSTRIAL APPLICABILITY

When the present disclosure is applied, production costs of a battery module may be reduced and the volume of the battery module may be reduced.

What is claimed is:

1. A battery module comprising:
a cell assembly in which a plurality of cells are arranged at a predetermined interval, wherein each of the plurality of cells comprises a cell lead that is located at one side of the cell assembly;
a sensing wire harness disposed at the one side of the cell assembly and around the cell lead, and comprising a connecting terminal corresponding to the cell lead, wherein the connecting terminal is directly bonded to the cell lead at the one side of the cell assembly; and
a connector connected to the sensing wire harness at the one side of the cell assembly,
wherein the cell lead, the sensing wire harness and the connecting terminal are arranged at the one side of the cell assembly,
wherein the cell lead comprises a first lead plate and a second lead plate that overlap and contact each other from opposite directions,
wherein the sensing wire harness further includes at least two wires that extend out of one side of the connector, take opposite turns around the connector, and extend away from the connector in an arrangement parallel to each other, and
wherein the connector is located between the at least two wires.

2. The battery module of claim 1, wherein the connecting terminal of the sensing wire harness is bonded to the cell lead via welding.

3. The battery module of claim 1; wherein the cell lead is provided on two sides of the connector at a predetermined interval, and
the sensing wire harness extends in an arrangement direction of the cell lead.

4. The battery module of claim 1, wherein the connector is fixed to a body of the cell assembly by a screw member.

5. The battery module of claim 1, wherein each of the first lead plate and the second lead plate is formed of at least two layers, so that the cell lead comprises at least four separate layers to minimize deformation of the cell lead due to thermal expansion from welding.

6. The battery module of claim 1, wherein the one side is a top side of the cell assembly, and
wherein the cell lead, the sensing wire harness and the connecting terminal are arranged only at the top side of the cell assembly.

7. The battery module of claim 1, wherein the connecting terminal is provided as a plurality of connecting terminals, and
wherein the plurality of connecting terminals are disposed on opposite sides of the sensing wire harness.

8. An assembly method of a battery module, the assembly method comprising:
(a) preparing a cell assembly in which a plurality of cells are arranged, wherein each of the plurality of cells comprises a cell lead located at one side of the cell assembly;

(b) locating a sensing wire harness comprising a connecting terminal around the cell lead at the one side of the cell assembly and adjacent a connector;
(c) aligning the connecting terminal of the sensing wire harness to correspond to each cell lead at the one side of the cell assembly; and
(d) directly bonding the connecting terminal to the cell lead,
wherein the cell lead, the sensing wire harness and the connecting terminal are arranged at the one side of the cell assembly,
wherein the cell lead comprises a first lead plate and a second lead plate that overlap and contact each other from opposite directions,
wherein the sensing wire harness further includes at least two wires that extend out of one side of the connector, take opposite turns around the connector, and extend away from the connector in an arrangement parallel to each other, and
wherein the connector is located between the at least two wires.

9. The assembly method of claim 8, wherein, in the operation (d), the connecting terminal of the sensing wire harness is directly welded to the cell lead by performing ultrasonic welding or laser welding.

10. The assembly method of claim 9, wherein the welding is performed while the connecting terminal of the sensing wire harness is aligned to correspond to the cell lead by using a jig.

11. The assembly method of claim 8, wherein the operation (b) further comprises disposing the connector connectable to the sensing wire harness on a top of a body of the cell assembly and fixing the connector by using a screw member.

12. The assembly method of claim 11, wherein the connector is disposed such that the cell lead is located on two sides of the connector.

13. The assembly method of claim 12, wherein, in the operation (b), the cell lead is disposed at two sides of the connector at a predetermined interval, and
the sensing wire harness is disposed to extend in an arrangement direction of the cell lead.

14. An assembly method of a battery module, the assembly method comprising:
(1) preparing a cell assembly in which a plurality of cells are arranged at a predetermined interval, wherein a cell lead comprising a first lead plate is drawn out from each of the plurality of cells, the cell lead being located at one side of the cell assembly;
(2) preparing a sensing wire harness comprising a connecting terminal and directly bonding a second lead plate to the connecting terminal;
(3) locating the sensing wire harness around the cell lead at the one side of the cell assembly adjacent a connector; and
(4) bonding the first lead plate and the second lead plate to overlap each other,
wherein the cell lead, the sensing wire harness and the connecting terminal are arranged at the one side of the cell assembly,
wherein the cell lead comprises a first lead plate and a second plate that overlap and contact each other from opposite directions,
wherein the sensing wire harness further includes at least two wires that extend out of one side of the connector, take opposite turns around the connector, and extend away from the connector in an arrangement parallel to each other, and
wherein the connector is located between the at least two wires.

15. The assembly method of claim 14, wherein, in the operation (2), the connecting terminal of the sensing wire harness is directly welded to the second lead plate by, performing ultrasonic welding or laser welding.

16. The assembly method of claim 14, further comprising disposing the connector connectable to the sensing wire harness on a top of a body of the cell assembly, and fixing the connector by using a screw member.

17. The assembly method of claim 16, wherein the connector is disposed such that the cell lead is located on two sides of the connector.

18. The assembly method of claim 17, wherein, in the operation (3), the cell lead is disposed at two sides of the connector at a predetermined interval and
the sensing wire harness is disposed to extend in an arrangement direction of the cell lead.

* * * * *